(No Model.)
D. W. RICHARDSON.
HOE.
No. 501,662. Patented July 18, 1893.
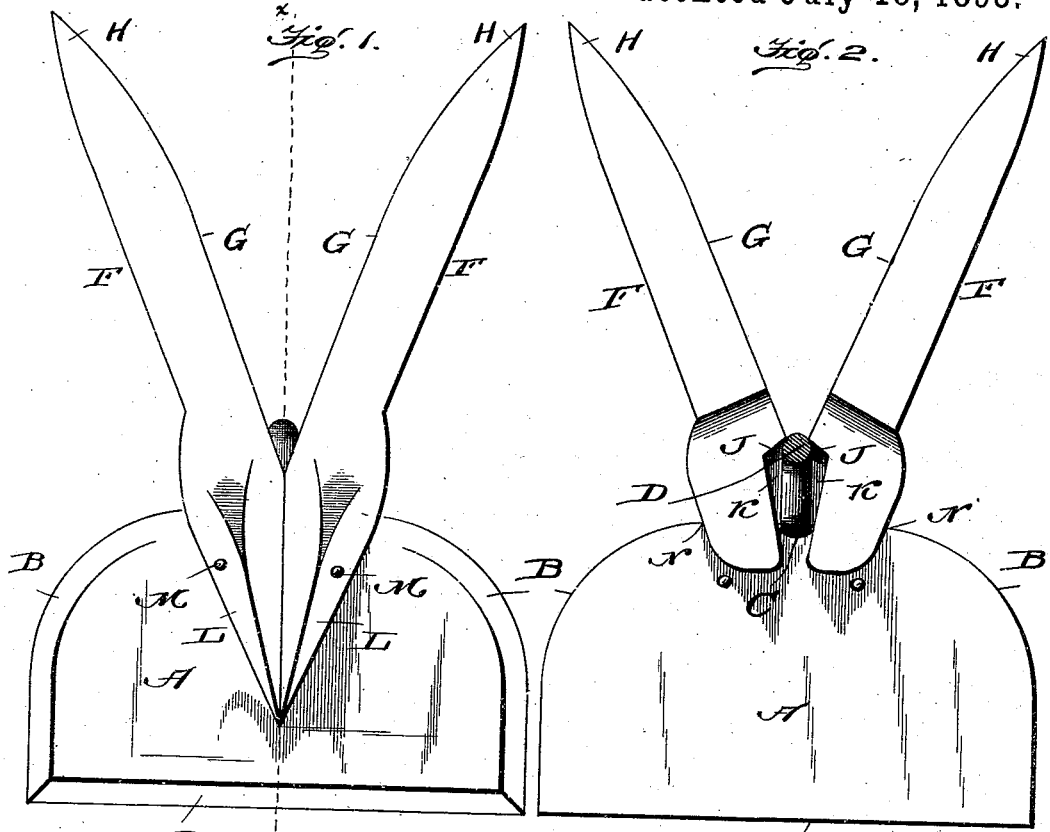
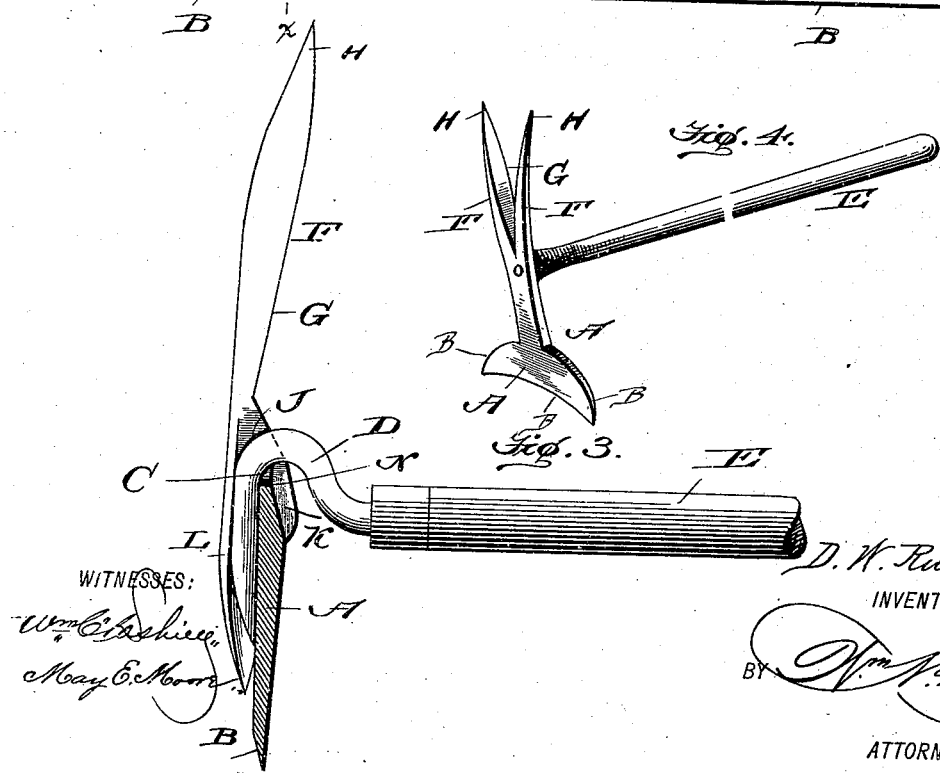
WITNESSES:
D. W. Richardson,
INVENTOR
BY
ATTORNEY.

UNITED STATES PATENT OFFICE.

DANIEL W. RICHARDSON, OF SOUTH FRANKFORT, ASSIGNOR OF ONE-THIRD TO H. MAY, OF FRANKFORT, MICHIGAN.

HOE.

SPECIFICATION forming part of Letters Patent No. 501,662, dated July 18, 1893.

Application filed December 14, 1892. Serial No. 455,127. (No model.)

*To all whom it may concern:*

Be it known that I, DANIEL W. RICHARDSON, a citizen of the United States, residing at South Frankfort, in the county of Benzie and State of Michigan, have invented certain new and useful Improvements in Hoes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in hoes, and relates especially to an attachment to hoes for removing roots, potatoes, turnips and the like without danger to the same or use of the hands.

The object of my invention is the provision of an attachment which can be quickly and easily applied to an ordinary or common hoe and perform its functions in a perfect manner and which will be durable, simple and inexpensive in construction to render the device practical and useful.

To attain the desired objects the invention consists in certain improvements in the construction, combination and adaptation of parts of the device for service which will be understood from the drawings and description.

Figure 1 represents a front view of an ordinary hoe provided with my improvements. Fig. 2 represents a rear view of the same. Fig. 3 is a longitudinal section on the line x—x of Fig. 1, and Fig. 4 is a perspective view of a modification.

Referring by letter to the drawings—A designates the hoe blade preferably having the edges B beveled to form cutting edges, and having the upper recessed portion C, to allow of the easy attachment of the shank D, to which the handle E is applied.

The hoe may be of the construction just described or of any preferred construction and in connection with the hoe I employ my device for removing roots or for analogous purposes, which consists of the two blades, tines or teeth F, having the cutting edges G, and terminating in the points H, and the blades are further thickened or formed with the shoulders J, the recesses K for fitting on the upper edges of the hoe blade and the reduced lower ends L, which are secured by fastenings M to the hoe blade and the blades are channeled at N to allow them to fit over the bend of the hoe shank as clearly shown. From this construction it will be seen that the blades diverge from their point of connection with the hoe blade and form a crotch whereby the small roots may be caught and readily removed. It will also be seen that the blades will enter the ground with ease by reason of the cutting edges and will remove roots or stumps with ease. It will also be apparent that the attachment can be readily applied or detached at will and can be used on an ordinary hoe or in fact on any hoe. It will also be understood that the lower reduced ends of the device serve to reinforce or strengthen the hoe blade and that the peculiar oval shape of the blades permit them to enter the ground with ease.

It is evident that I provide an attachment which is simple, durable and inexpensive and which will prove practical and useful and further comment is unnecessary.

I claim as my invention—

1. A hoe consisting of the hoe-blade having lower straight and side curved cutting edges, tines connected to the blade and curved outward and terminating in a point having cutting edges on each side, and a handle connected to the blade.

2. A hoe consisting of the blade, shank and handle, the teeth detachably connected to the blade having the shoulders and recesses fitting on the upper edge of the hoe blade, and the reduced lower ends secured to the hoe blade, substantially as described.

3. In a hoe, the combination with a hoe blade, of two blades or tines provided with cutting edges and having shoulders provided with recesses fitting on the edge of the hoe blade, and reduced ends secured to the said hoe blade and the handle having the shank secured to the hoe blade adjacent to the reduced ends of the tines, substantially as described.

In testimony whereof I affix my signature in presence of two witnesses.

DANIEL W. RICHARDSON.

Witnesses:
W. J. PETTITT,
ETTA S. NEVINS.